(12) United States Patent
Ni (10) Patent No.: US 7,407,390 B1
(45) Date of Patent: Aug. 5, 2008

(54) USB DEVICE WITH PLASTIC HOUSING HAVING INSERTED PLUG SUPPORT

(75) Inventor: Jim Ni, San Jose, CA (US)

(73) Assignee: Super Talent Electronics, Inc., San Jose, CA (US)

( * ) Notice: Subject to any disclaimer, the term of this patent is extended or adjusted under 35 U.S.C. 154(b) by 299 days.

(21) Appl. No.: 11/379,736

(22) Filed: Apr. 21, 2006

Related U.S. Application Data (63) Continuation-in-part of application No. 11/131,066, filed on May 16, 2005, now Pat. No. 7,052,287.

(51) Int. Cl.
*H01R 12/00* (2006.01)
(52) U.S. Cl. .................. 439/76.1; 439/660; 439/906; 361/752
(58) Field of Classification Search .............. 439/76.1, 439/660, 906; 361/752
See application file for complete search history.

(56) References Cited

U.S. PATENT DOCUMENTS

| | | | |
|---|---|---|---|
| 5,400,216 A | 3/1995 | Tsai | |
| 5,941,725 A | 8/1999 | Brennan et al. | |
| 5,941,733 A | 8/1999 | Lai | |
| 6,036,544 A | 3/2000 | Brunker et al. | |
| 6,135,786 A | 10/2000 | Johnson et al. | |
| 6,241,534 B1 | 6/2001 | Neer et al. | |
| 6,309,255 B1 | 10/2001 | Yu | |
| 6,332,783 B1 | 12/2001 | Ukiya et al. | |
| 6,490,163 B1 * | 12/2002 | Pua et al. | 361/737 |
| 6,618,243 B1 | 9/2003 | Tirosh | |
| 6,671,808 B1 | 12/2003 | Abbott et al. | |
| 6,676,419 B1 | 1/2004 | Lin et al. | |
| 6,733,329 B2 | 5/2004 | Yang | |
| 6,744,634 B2 | 6/2004 | Yen | |
| 6,778,401 B1 | 8/2004 | Yu et al. | |
| 6,804,749 B2 | 10/2004 | Chien et al. | |
| 6,813,164 B2 | 11/2004 | Yen | |
| 6,854,984 B1 | 2/2005 | Lee et al. | |
| 6,877,994 B2 | 4/2005 | Huang | |
| 6,944,028 B1 | 9/2005 | Yu et al. | |
| 6,948,983 B1 | 9/2005 | Peng | |
| 6,999,322 B1 | 2/2006 | Lin | |
| 7,004,794 B2 | 2/2006 | Wang et al. | |
| 7,035,110 B1 | 4/2006 | Wang et al. | |
| 7,044,802 B2 | 5/2006 | Chiou et al. | |
| 7,052,287 B1 | 5/2006 | Ni et al. | |
| 7,068,517 B2 | 6/2006 | Yen | |

(Continued)

*Primary Examiner*—Truc T Nguyen
(74) *Attorney, Agent, or Firm*—Bever, Hoffman & Harms, LLP; Patrick T. Bever (57) ABSTRACT

A Universal-Serial-Bus (USB) device includes a PCBA mounted inside a plastic housing molded from a hard plastic (e.g., PC), and includes a handle portion mounted over a body section of the PCBA, and a plug support portion that is snap-coupled onto the housing and disposed under a plug section of the PCBA. The plug shell portion of the housing is integrally connected to (i.e., molded at the same time as or connected by way of molding to) the handle portion, and combines with the plug support structure extending under the plug section of the PCBA to form a structural arrangement similar to a conventional male USB connector plug that allows access to metal contacts formed on the PCBA, but without having the plug shell soldered to the PCBA.

13 Claims, 11 Drawing Sheets

U.S. PATENT DOCUMENTS

| | | |
|---|---|---|
| 7,074,052 B1 | 7/2006 | Ni et al. |
| 7,090,541 B1 | 8/2006 | Ho |
| 7,095,617 B1 | 8/2006 | Ni |
| 7,165,998 B2 | 1/2007 | Lee et al. |
| 7,172,460 B2 | 2/2007 | Zhao et al. |
| 7,186,147 B1 * | 3/2007 | Chou et al. ................ 439/660 |
| 7,241,153 B2 | 7/2007 | He et al. |
| 7,249,978 B1 | 7/2007 | Ni |
| 7,275,941 B1 | 10/2007 | Bushby |
| 2003/0100203 A1 | 5/2003 | Yen |
| 2004/0198079 A1 | 10/2004 | Aronson et al. |
| 2005/0085129 A1 | 4/2005 | Chiou et al. |

\* cited by examiner

USB DEVICE WITH PLASTIC HOUSING HAVING INSERTED PLUG SUPPORT

CROSS-REFERENCE TO RELATED APPLICATIONS

The present application is a continuation-in-part of co-owned and co-pending U.S. application Ser. No. 11/131,066, filed May 16, 2005, entitled "USB Device With Plastic Housing Having Integrated Plug Shell", which is incorporated herein by reference in its entirety.

FIELD OF THE INVENTION

This invention relates to portable electronic devices, and more particularly to portable electronic devices that utilize the Universal-Serial-Bus (USB) specification.

BACKGROUND OF THE INVENTION

Rapid advances in technology in several areas have converged to enable small, portable memory cards with vast capacities. Flash memory technologies such as those using electrically-erasable programmable read-only memory (EEPROM) have produced chips storing 128 M-Bytes or more. Small flash-memory cards have been designed that have a connector that can plug into a specialized reader, such as for compact-flash, secure-digital, memory stick, or other standardized formats.

More recently, flash memory cards are being sold that contain a USB connector. Such USB-flash memory cards do not require a specialized reader but can be plugged into a USE connector on a host system, such as a personal computer (PC). These USB-flash memory cards can be used in place of floppy disks. A USE-flash card can have a capacity of more than ten floppy disks in an area not much larger than a large postage stamp.

Figure 16A:
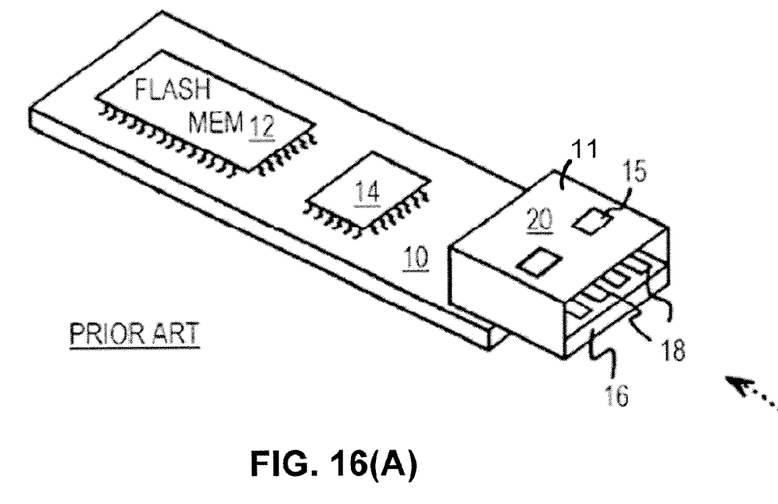
FIG. 16(A) shows a prior-art flash-memory card with a USB connector.

FIG. 16(A) shows a prior-art flash-memory card with a conventional male USB connector. Flash memory chip ~12 may be a 128 Mega-byte non-volatile chip or may have some other capacity. Controller chip 14 contains a flash-memory controller that generates signals to access memory locations within flash memory chip 12. Controller chip 14 also contains a USB interface controller that serially transfers data to and from flash memory chip 12 over a USB connection.

Male USB connector 20 may be mounted on board 10, which is a small circuit board with chips 12, 14 mounted thereon. Multi-layer printed-circuit board (PCB) technology can be used for board 10. A plastic case (not shown) can surround board 10.

Male USB connector 20 contains a small connector substrate 16, which is often white ceramic, black rigid plastic, or another sturdy substrate. Connector substrate 16 has four or more metal contacts 18 formed thereon. Metal contacts 18 carry the USB signals generated or received by controller chip 14. USB signals include power, ground, and serial differential data D+, D−.

Male USB connector 20 contains a metal case (plug shell) 11 that wraps around connector substrate 16. The plug shell touches connector substrate 16 on three of the sides of connector substrate 16. The top side of connector substrate 16, holding metal contacts 18, has a large gap to the top of the plug shell. On the top and bottom of this metal wrap are formed holes 15. USB connector 20 is a type-A USB connector.

Figure 16B:
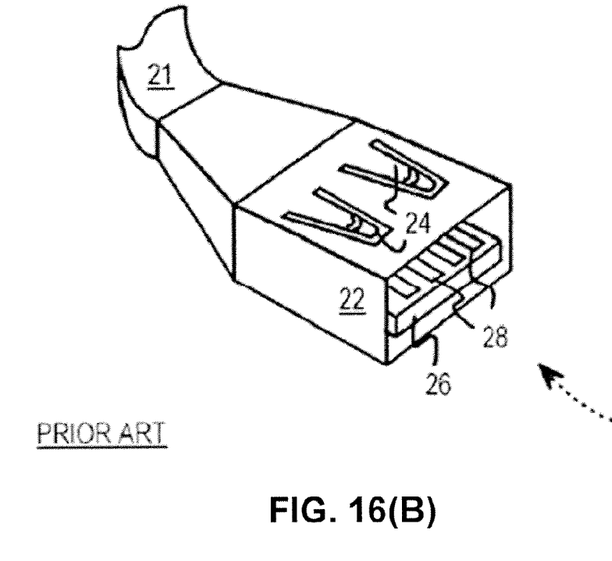
FIG. 16(B) shows a female USB connector.

FIG. 16(B) shows a female USB socket connector 22. Female USB socket connector 22 can be an integral part of a PC or other host system, or can be connected by cable 21 to such a host system. Another connector substrate 26 contains four metal contacts 28 that make electrical contact with the four metal contacts 18 of the male USB connector 20 of FIG. 16(A). Connector substrate 26 is wrapped by a metal case, but small gaps are between the metal case and connector substrate 26 on the lower three sides.

Locking is provided by metal springs 24 in the top and bottom of the metal plug shell. When male USB connector 20 of FIG. 16(A) is flipped over and inserted into Female USB socket connector 22 of FIG. 16(B), metal springs 24 lock into holes 15 of male USB connector 20.

Figure 17A:
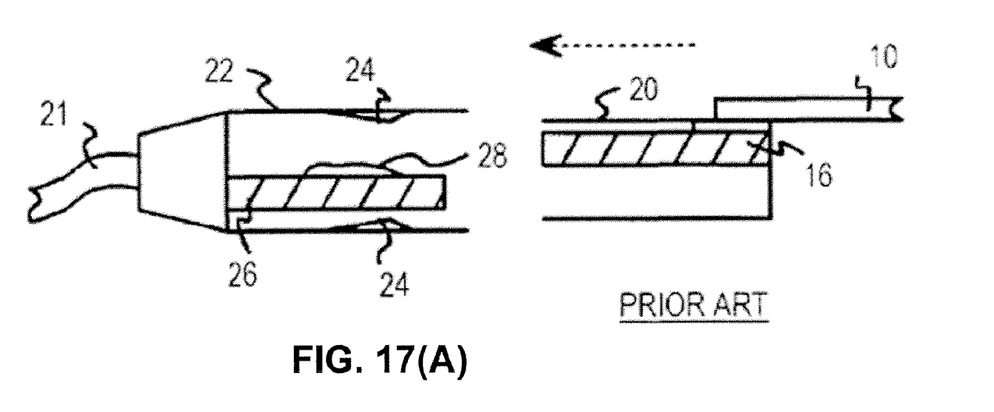
FIGS. 17(A) and 17(B) are cross-sections highlighting connections between male and female USB connectors.
Figure 17B:
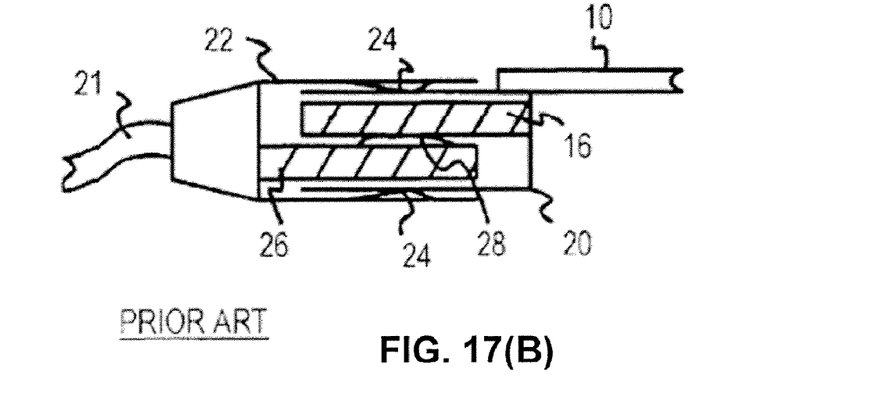

FIGS. 17(A) and 17(B) are cross-sections highlighting connections between male and female USB connectors. Female USB socket connector 22 is on the left while male USB connector 20 is being inserted from the right. Male USB connector 20 is flipped over relative to the view of FIG. 16(A). Metal contacts 18 are formed on the lower surface of connector substrate 16 on male USB connector 20, while metal contacts 28 are formed on the upper surface of connector substrate 26 on female USB socket connector 22. Thus the metal contacts face one another to allow for electrical contact when male USB connector 20 is inserted into female USB socket connector 22 as shown in FIG. 17(B).

Metal springs 24 formed on the metal case surrounding connector substrate 26 on Female USB socket connector 22 fit into holes on the plug shell of male USB connector 20. This helps to lock the connectors together.

A problem associated with the production of conventional male USB devices that utilize standard male USB plug connectors typically require lead-based soldering methods to attach the standard plug structure (e.g., substrate 16 and plug shell 11) to circuit board 10. Lead (Pb) is recognized as a hazardous material, and may at some point in time be banned from use. Lead-free soldering requires higher peak temperatures (about 240° C.) that can shrink or warp plastic substrates, thereby making such conventional USB plug connector structures unsuitable for lead-free fabrication processes.

Figure 18:
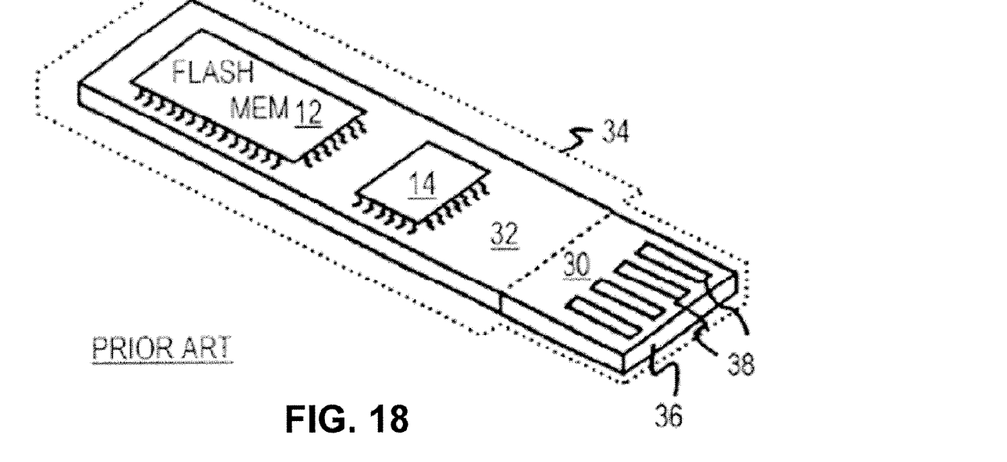
FIG. 18 shows a prior-art USB flash memory card using a USB connector.

FIG. 18 shows a prior-art USB flash memory card using a low-profile USB connector that avoids the need for attaching a separate substrate and plug shell to a circuit board by integrating male USB connector 30 with board 32, and by omitting the plug shell entirely. Board 32 is a PCB that has flash memory chip 12 and controller chip 14 mounted thereon. Board 32 is extended to include male USB connector 30, which has metal contacts 38 formed on end 36 of board 32. The width and thickness of board 32 at end 36 containing male USB connector 30 is designed to approximately match that of connector substrate 16 of FIG. 16(A). Plastic case 34 can enclose board 32 but have an opening for metal contacts 38. Plastic case 34 can cover the bottom and sides of male USB connector 30 up to end 36 to emulate portions of the metal case of the male USB connector of FIG. 16(A).

Figure 19A:
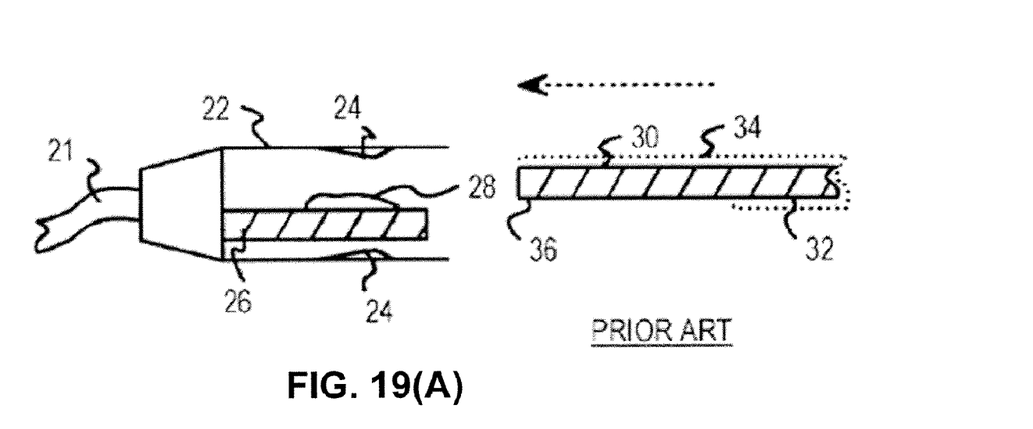
FIGS. 19(A) and 19(B) show cross-sections of the prior-art USB connector of FIG. 18 being inserted into a standard female USR connector socket.
Figure 19B:
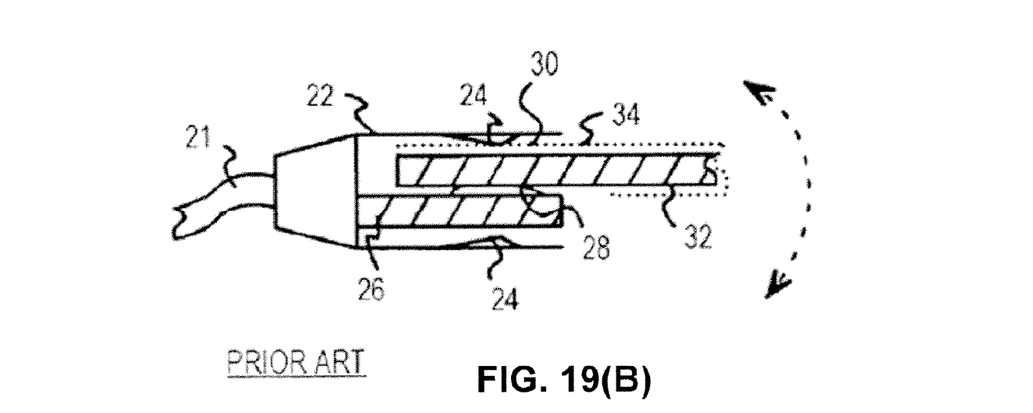

FIGS. 19(A) and 19(B) show cross-sections of the prior-art lower-profile USB connector being inserted into a standard Female USB connector. Board 32 that has male USB connector 30 formed on end 36 is flipped over from the view shown in FIG. 18, and end 36 is inserted into female USB socket connector 22 from the right side.

Metal contacts 38 are located on the lower surface of male USB connector 30. Plastic case 34 has an opening on the lower surface of male USB connector 30 to expose the metal contacts so they can make electrical connection with metal contacts 28 on the upper surface of connector substrate 26 of Female USE socket connector 22 when inserted as shown in FIG. 19(B).

Plastic case 34 helps to fill the gate between board 32 and the top edge of the metal case of Female USB socket connector 22. However, no holes are provided in plastic case 34, so metal springs 24 are pushed up slightly when male USE connector 30 is inserted into Female USE socket connector 22. Plastic case 34 is also formed along the thin edges of board 32 and helps to fill in the gaps between connector substrate 26 and the sides of the metal case of Female USE socket connector 22 that are above and below the plane of FIG. 19(B).

While USB connector 30 can be less expensive and smaller than the standard USE connector and avoids the need for plug shell, it can have the undesirable characteristic of wobbling in the female USB connector socket, and exposes contacts 38 to damage.

What is needed is a USB device having a male USE connector plug that avoids the need for soldering the plug shell to the circuit board. What is also needed is a method for manufacturing such USB devices.

SUMMARY OF THE INVENTION

The present invention is directed to a USB device in which the plug shell is either integrally molded onto a plastic housing or integrally connected to and formed by the plastic housing such that the plug shell is formed or mounted over a PCB plug portion of a printed circuit board assembly (PCBA), thereby avoiding the need for soldering the plug shell to the PCBA as in conventional manufacturing methods. The PCBA includes a printed circuit board (PCB) having a PCB body (rear) section and the PCB plug (front) section, metal contacts disposed on the PCB plug section, and USB-compatible integrated circuits (ICs) mounted on the PCB body section. The plastic housing includes a handle portion mounted over the PCB body section, a plug shell structure that is integrally molded or otherwise connected to and extends from a front end of the handle portion, and a plug support structure that is inserted into the plug shell structure and snap-coupled or otherwise secured to the housing portion. The PCB plug section is mounted onto the plug support portion such that the plug support portion covers and supports the lower surface of the PCB plug section, and the upper surface of the PCB plug section is exposed above the plug support portion. The plug shell structure includes a lower wall that extends under the plug support portion, side walls that extend along side edges of the plug support portion, and an upper wall that extends over the upper surface of the PCB plug section such that the upper wall of the plug shell is positioned over and spaced from the upper surface of the PCB plug section by a predetermined gap distance that allows insertion of the USB device into a standard female connector socket. With this arrangement, the plug portion and the plug shell facilitate reliable and secure connection of the USB device to a standard female USB connection socket without requiring lead-based soldering of either the substrate or the plug shell to the PCB, thus facilitating the production of lead-free USB devices. In one embodiment, to facilitate repeated contact between the plug structure and a standard female USB connector socket, the housing is molded using relatively hard plastic, such as PC.

BRIEF DESCRIPTION OF THE DRAWINGS

These and other features, aspects and advantages of the present invention will become better understood with regard to the following description, appended claims, and accompanying drawings, where:

DETAILED DESCRIPTION OF THE DRAWINGS

The present invention relates to an improvement in USB connectors. The following description is presented to enable one of ordinary skill in the art to make and use the invention as provided in the context of a particular application and its requirements. As used herein, directional terms such as "upper", "upwards", "lower", "downward", "front", "rear", are intended to provide relative positions for purposes of description, and are not intended to designate an absolute frame of reference. In addition, the phrases "integrally connected" and "integrally molded" is used herein to describe the connective relationship between two portions of a single molded or machined structure, and are distinguished from the terms "connected" or "coupled" (without the modifier "integrally"), which indicates two separate structures that are joined by way of, for example, adhesive, fastener, clip, or movable joint. Various modifications to the preferred embodiment will be apparent to those with skill in the art, and the general principles defined herein may be applied to other embodiments. Therefore, the present invention is not intended to be limited to the particular embodiments shown and described, but is to be accorded the widest scope consistent with the principles and novel features herein disclosed.

Figure 1:
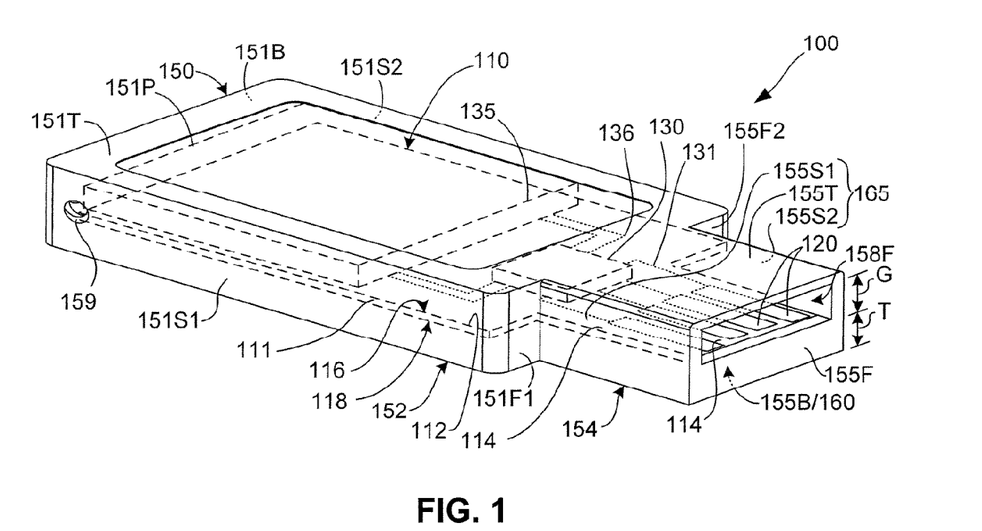
FIG. 1 is a top side perspective view showing an exemplary USB device according to an embodiment of the present invention.
Figure 2:
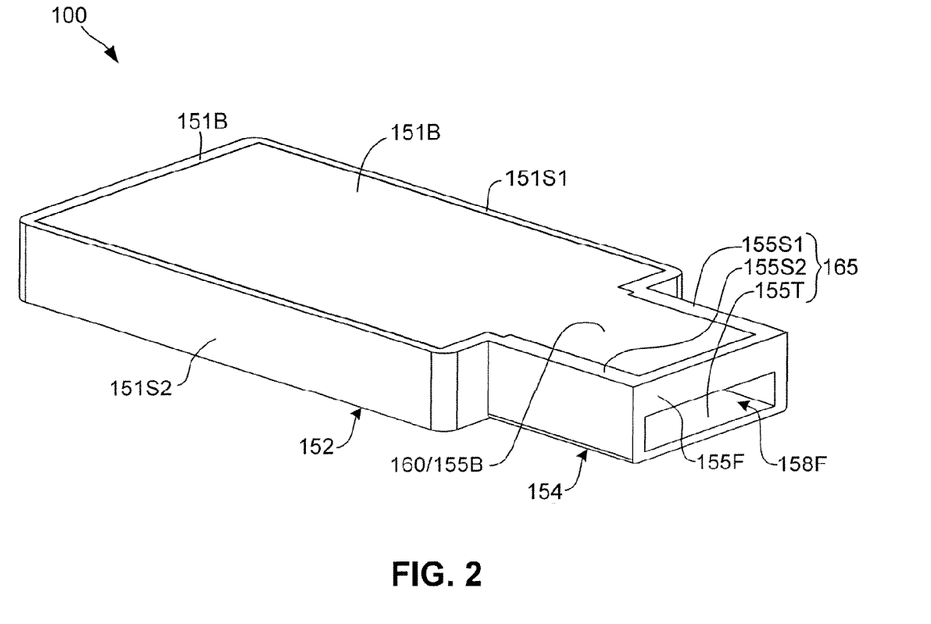
FIG. 2 is a bottom side perspective view showing the USB device of FIG. 1.

FIGS. 1 and 2 are top and bottom perspective views, respectively, showing a Universal-Serial-Bus (USB) device 100 according to a first embodiment of the present invention. USB device 100 generally includes a printed circuit board assembly (PCBA) 110 and a housing 150 that is fixedly mounted onto PCBA 110.

Figure 3:
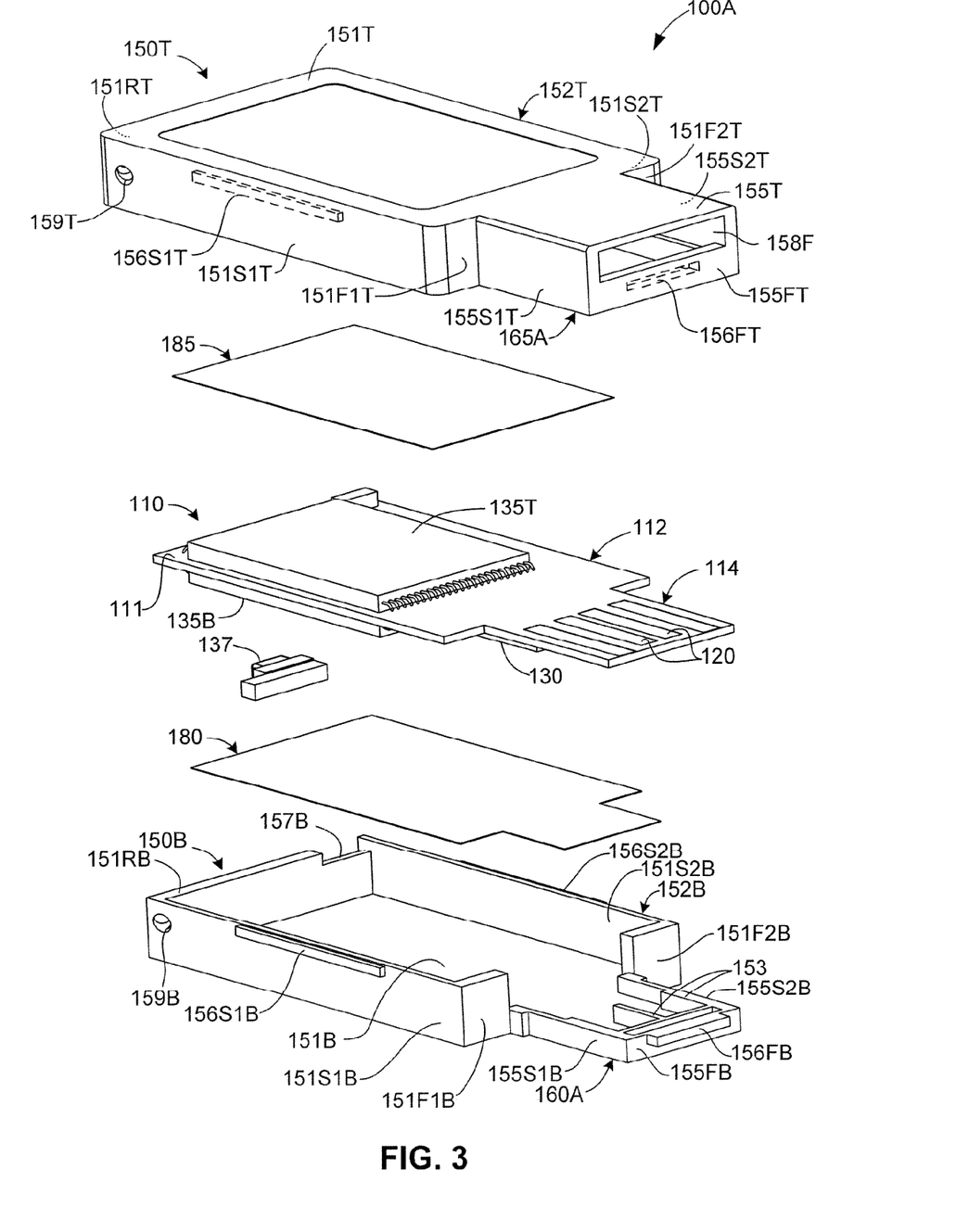
FIG. 3 is an exploded perspective view showing the USB device of FIG. 1.

Referring to the upper portion of FIG. 1 and to FIG. 3, PCBA 110 includes a printed circuit board (PCB) 111 including a relatively wide PCB handle section 112 and a relatively narrow PCB plug section 114 that extends from a front end of PCB handle section 112. PCB 111 is a substantially flat substrate, and has opposing sides that are referred to below as upper surface 116 and surface 118. Formed on upper surface 116 in plug section 114 are four metal contacts 120. Metal contacts 120 are shaped and arranged in a pattern established by the USB specification. At least one control integrated circuit (IC) 130 and zero or more auxiliary ICs 135 (e.g., a flash memory device or an RF communication circuit) are mounted on at least one of upper surface 116 and lower surface 118. ICs 130 and 135 are electrically connected to each other and to metal contacts 120 by way of metal traces 131 and 136, respectively (a few traces are depicted in FIG. 1 in a simplified manner by dashed lines for illustrative purposes). PCB 111 is formed in accordance with known PCB manufacturing techniques such that metal contacts 120 and ICs 130 and 135 (as well as zero or more other circuit components, which are omitted for brevity) are electrically interconnected by a predefined network including conductive traces 131 and 136 and other conducting structures that are sandwiched between multiple layers of an insulating material (e.g., FR4) and adhesive.

Referring to FIG. 1, housing 150 is a molded plastic structure generally includes a handle portion 152 mounted over PCB body section 112 such that ICs 130 and 135 are enclosed therein, and a plug portion 154 integrally connected to and extending from handle portion 152. Handle portion 152 is a box-like structure including parallel upper and lower cover walls 151T and 151B and a peripheral side wall, formed by parallel side walls 151S1 and 151S2 and a rear wall 155R, that extends between upper and lower cover walls 151T and 151B. Plug portion 154 includes a plug substrate structure 160, including a lower plug wall 155B, that extends under and abuts (supports) lower surface 118 of PCB plug section 114, and a plug shell structure 165 that is positioned over upper surface 116 of PCB plug section 114.

Figures 4A, 4B, 5A, 5B:
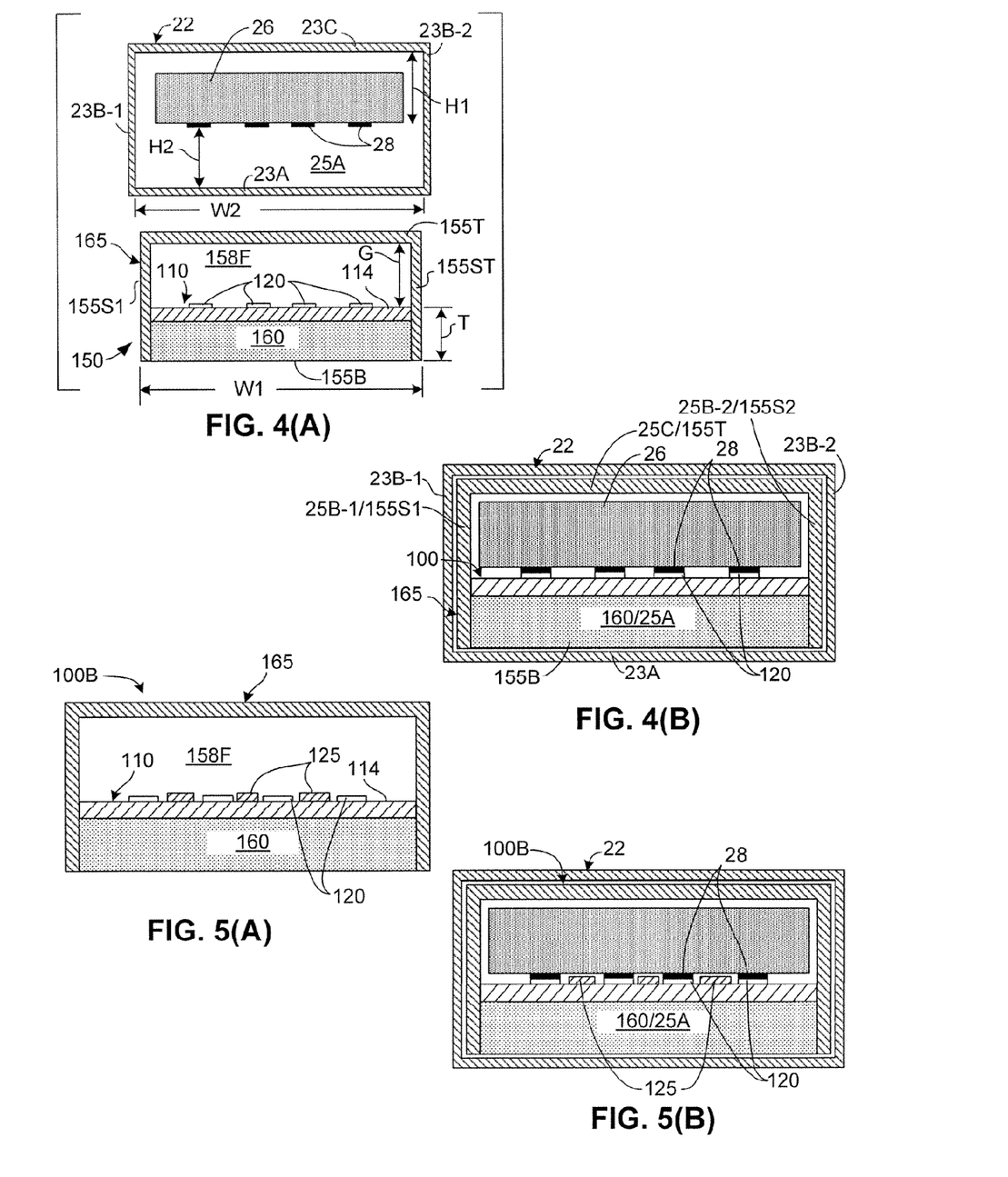
FIGS. 4(A) and 4(B) are cross-sectional side views showing a plug structure of the USB device of FIG. 1 and a standard female USB connector socket.
FIGS. 5(A) and 5(B) are cross-sectional side views showing a plug structure of an alternative USB device according to another embodiment of the present invention.

In accordance with an aspect of the present invention, as depicted in FIG. 1, plug substrate structure 160 and plug shell structure 165 collectively form a plug structure that is substantially identical to the plug shell of conventional male USB connectors without requiring soldering either structure to PCBA 110, as required in conventional male USB connectors, thereby facilitating the production of lead-free USB devices. Plug shell structure 165 includes first and second shell side walls 155S1 and 155S2 respectively connected to opposing side edges of and extending upward from plug substrate structure 160 along respective side edges of PCB plug section 114, and an upper shell wall 155T integrally connected to upper ends of shell side walls 155S1 and 155S2. Upper wall 151T is positioned over and spaced from upper surface 116 of PCB plug section 114 (i.e., from metal contacts 120) by a predetermined gap G., which is exposed through a front wall 155F of handle portion 152 by a front opening 158F. Note that front opening 158F exposes metal contacts 120 in gap G. Therefore, as depicted in FIG. 4(A), when PCBA 110 is mounted inside housing 150, plug substrate structure 160 is positioned under PCB plug section 114 and upper wall 155T of plug shell structure 165 is positioned over metal contacts 120 to collectively form the plug structure that is similar to the arrangement associated with conventional male USB connector plugs. In particular, as indicated in FIG. 4(A), gap distance G generally corresponds to a height H1 between metal contacts 28 and upper wall 23C of conventional standard female USB connector socket 22. Similarly, plug substrate structure 160 is formed such that the upper surface of PCB plug section 114 (i.e., metal contacts 120) are spaced a predetermined distance T from a lower surface of plug substrate structure 160 (i.e., the lower surface of bottom wall 155B), which distance T corresponds to a height H2 between metal contacts 28 and lower wall 23A of conventional standard female USB connector socket 22. Finally, shell side walls 155S1 and 155S2 of plug shell structure 165 are spaced apart by a width W1 that generally corresponds to the width W2 associated with side walls 23B-1 and 23B-2 of standard female USB connector socket 22. Accordingly, as indicated in FIG. 4(B), when inserted into standard female USB connector socket 22, PCB plug section 114, plug substrate structure 160 and plug shell structure 165 are securely received in standard female USB connector socket 22 such that, like conventional male USB connectors, when plug portion 154 is inserted inside standard female USB connector socket 22, metal contacts 120 slide against and are contacted by corresponding metal contacts 28 of the female connector. In particular, PCB plug section 114 and plug substrate structure 160 are sized to be received in lower socket region 25A of female USB connector socket 22 with shell side walls 155S1 and 155S2 respectively received in side socket regions 25B-1 and 25B-2, and shell upper wall 155T received in upper socket region 25C. Further, because shell side walls 155S1 and 155S2 and upper shell wall 155T are respectively integrally connected to corresponding side walls 151S1 and 151S2 and upper wall 151T of handle portion 152, respectively, and plug substrate structure 160 (e.g., bottom wall 155B, shown in FIG. 2) is integrally connected to bottom wall 155B of handle portion 152, the entire plug structure of USB device 100 is part of molded plastic housing 150 that mounts over PCBA 110, and thus does not require separate connection (e.g., by way of soldering) to PCBA 110.

According to another aspect, because, during expected normal use, plug substrate structure 160 and plug shell structure 165 are subjected to repeated contact with the metal cage of a standard female USB connector socket, housing 150 is preferably formed using a relatively hard plastic (e.g., Nylon or PC). In some embodiments produced for applications in which limited contact between USB device 100 and a standard female USB connector socket is anticipated, housing 150 may be formed using a relative soft plastic (e.g., ABS).

FIG. 3 is an exploded perspective view showing a USB device 100A in accordance with a specific embodiment of the present embodiment in which housing 150 is mounted over PCBA 110 using a convenient snap-coupled arrangement. In particular, housing 150 generally includes a lower housing portion 150B and an upper housing portion 150T that snap-couple to each other over PCBA 110. Optional 180 and 185 are utilized to further secure lower housing portion 150B to upper housing portion 150T in the manner described below. Structures of USB device 100A that are identical to or similar to corresponding structures of generalized USB device 100 (shown in FIGS. 1 and 2) are identified with the same or similar reference numbers.

Referring to the bottom of FIG. 3, lower housing portion 150B generally includes a lower handle portion 152B and a plug substrate structure 160A. Lower handle portion 152B includes a lower wall 151B and an inner peripheral wall formed by lower side walls 151B and 151S2B and lower rear wall 151RB extending upward from (perpendicular to) peripheral edges of lower wall 151B. Plug substrate structure 160A extends from a front wall portions 151F1B and 151F2B of lower handle portion 152B, which defines a gap as shown in FIG. 3 to facilitate mounting of PCBA 110. Plug substrate structure 160A includes several support ribs 153 that extend upward from a lower plug wall 155B and, when mounted below PCBA 110, contact and help support plug section 114 of PCB 111. Support ribs 153 are surrounded on three sides by lower plug side walls 155S1B and 155S2B and lower plug front wall 155FB.

Upper housing portion 150T generally includes an upper handle portion 152T and a plug shell structure 165A. Upper handle portion 152T includes upper wall 151T and an outer peripheral wall formed by upper side walls 151S1T and 151S2T and upper rear wall 151RT, which extend downward from (perpendicular to) peripheral edges of upper wall 151T. Plug shell structure 165A extends from upper front wall sections 151F1T and 151F2T, and includes a peripheral wall formed by upper plug side walls 155S1T and 155S2T and upper plug front wall 155FT, which defines front opening 158F. Upper wall 155T is integrally connected to the peripheral wall.

In accordance with an aspect of the present embodiment invention, lower housing portion 150B and upper housing portion 150T are fabricated such that the housing portions can be snap-coupled over PCBA 110 during the housing assembly process. In particular, the respective peripheral walls of housing portions 150B and 150T are constructed such that the inner peripheral wall of lower housing portion 150B can be inserted inside the outer peripheral wall of upper housing portion 150T, whereby the outside surfaces of the inner peripheral wall abut the inside surfaces of the outer peripheral wall. In addition, either a slot or a tab are provided on the outside surface of the inner peripheral walls, and a corresponding tab or slot are provided on the inside surfaces of the outer peripheral walls, wherein each tab is snap-coupled into a corresponding slot when upper housing portion 150T is mounted onto the lower housing portion 150B. In the present embodiment, the outside surfaces of selected lower walls (e.g., lower side wall 151S1B and lower plug front wall 151FB) includes a corresponding tab (e.g., tabs 156S1B dad 156FB), and the inside surfaces of the outer peripheral walls (e.g., upper side wall 151S1T and upper plug front wall 155FT) of upper housing portion 150T defines a corresponding slot (e.g. 156S1T and 156FT) such that each tab is snap-coupled into a corresponding slot when upper housing portion 150T is mounted onto lower housing portion 150B. Note that the number of slots/tabs provided on each peripheral wall may be substantially arbitrarily selected, as well as the peripheral wall (inner or outer) on which the tabs/slots are provided. Note also that the various slots may either pass entirely through the corresponding wall, or as depicted by the dashed lines in the figures, be covered by an outer layer of the corresponding wall.

According to another aspect of the present invention, adhesive layers 180 and 185 are respectively provided between a lower PCBA surface (e.g., the surface of IC 135B facing downward from PCB 111) and lower cover wall 151B, and between an upper PCBA surface (e.g., the surface of IC 135T facing upward from PCB 111) and upper cover wall 151T in order to substantially permanently secure the housing formed by lower housing portion 150B and upper housing portion 150T over PCBA 110. Although the snap-coupling arrangement described above may be sufficient to prevent separation of housing portions 150B and 150T under normal operating conditions, the two housing portions may be separated during assembly. To prevent such disassembly, adhesive layers 180 and 185 serve to secure housing portions 150B and 150T together by way of PCBA 110. As mentioned above, PCBA 110 is formed using conventional PCB assembly procedures, and as such ICs 135B and 135T are rigidly secured to PCB 111. When secured to lower housing portion 150B by way of adhesive layer 180 and upper housing portion 150T by way of adhesive layer 185, PCBA 110 helps resist separation of the housing portions in response to an applied shearing force by resisting relative movement of the housing portions. In accordance with an embodiment of the present invention, adhesive layers 180 and 185 are pressure or heat activated, and mounted onto the inner surfaces of housing portions 150B and 150T before the assembly process is performed. In this manner, the snap-coupling procedure may be completed and reversed, if necessary, before permanent connection of housing portions 150B and 150T to PCBA 110 (e.g., in response to an applied pressure or heat). Alternatively, a standard adhesive may be used, but this may result in inadvertently gluing the housing portions together in a non-optimal position. In yet another embodiment, a liquid adhesive may be injected into the housing after the snap-coupling process to secure the PCBA to the cover plates.

Referring to the upper portion of FIG. 3, PCBA 110 also includes an optional light-pipe (light-generating device) 137 mounted onto either upper surface 116 or lower surface 118 of PCB 111 adjacent to a back edge of PCB 111. Light-pipe 137 is controlled by a signal generated, for example by control IC 130 and transmitted over an associated conductive trace formed on PCB 111 according to known techniques. To facilitate viewing of light-pipe 137, the rear walls (e.g., rear bottom wall 151RB) are provided with suitable access openings (e.g., opening 157B) that, when PCBA 110 is properly mounted inside housing 150, is aligned with light-pipe 137 such that light-pipe 137 is visible.

In accordance with another optional aspect of the present invention, USB device 100 may be provided with a through hole that passes through housing 150 to facilitate, for example, the engagement of a key-chain structure. In particular, referring to FIG. 3, lower housing portion 150B includes a lower opening 159B and upper housing portion 150T includes an upper opening 159 that align to form a coincident opening 159 (FIG. 1) when the upper and lower housing portions are snap-coupled together as described above.

FIGS. 5(A) and 5(B) are simplified front views showing the plug portion of a USB device 100B according to a variation of the embodiment described above. Structures of USB device 100B that are identical to those of USB device 100 are identified with the same reference numerals, and will not be described in detail for sake of brevity. In accordance with another aspect, PCBA 110 includes elongated metal dividers 125 formed on the upper surface of plug section 114, with each metal divider 125 being located between an adjacent pair of the metal contacts 120. Metal dividers 125 increase the rigidity of the plug structure, thus further enhancing the secure engagement between the plug structure and standard female USB socket connector 22.

In accordance with another aspect of the present invention, handle section 152 includes an indented panel section 151P formed in upper wall 151T, and a similar panel section formed in lower wall 151B, to facilitate manual manipulation of USB device 100.

Figure 6:
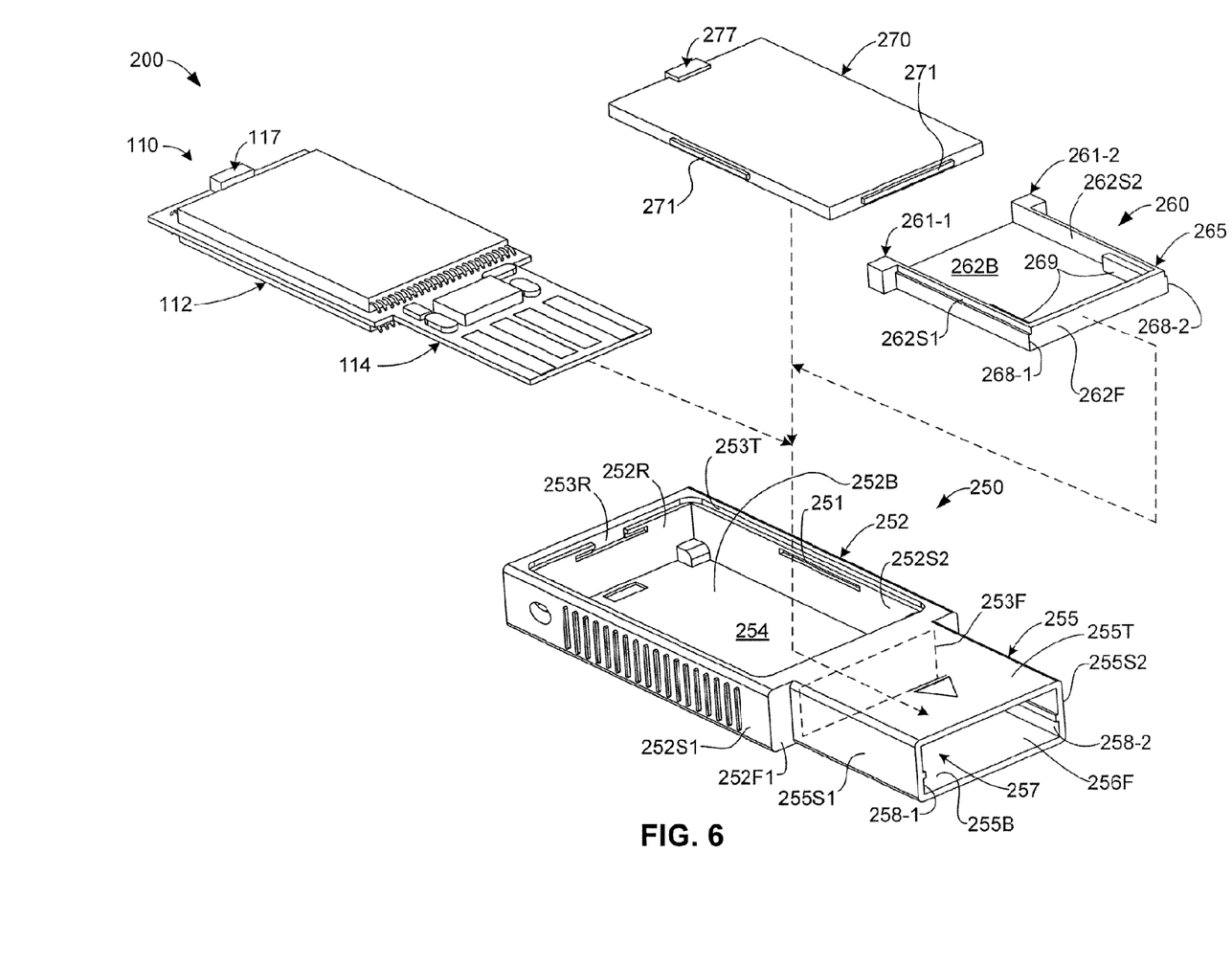
FIG. 6 is an exploded perspective view showing an exemplary USB device according to another embodiment of the present invention.

FIG. 6 is an exploded perspective view showing an USB device 200 according to another specific embodiment of the present invention. USB device 200 includes a plastic housing 250, a plug support structure 260, a cover plate 270, and PCBA 110 (discussed above).

Plastic housing 250 generally includes a handle portion 252 and a shell portion 255 that are integrally molded as a single plastic part. Handle portion 252 includes a rear wall 252R, and a front wall formed by front wall sections 252F1 and 252F2, parallel side walls 252S1 and 252S2 extending between the rear and front walls, and a lower cover wall 252B. Handle portion 252 defines a hollow region 254 that is accessible through an upper opening 253T that is defined by adjacent upper edges of side walls 252S1 and 252S2, rear wall 252R and front wall sections 252F1 and 252F2, and a front handle opening 253F is defined between front wall sections 252F1 and 252F2. Plug shell structure 255 includes a lower shell wall 255B, first and second shell side walls 255S1 and 255S2 extending upward from side edges of lower shell wall 255B, and an upper shell wall 255T integrally connected to upper ends of shell side walls 255S1 and 255S2. A hollow interior region 257 of plug shell portion 255 communicates with the hollow interior region 254 of handle portion 252 by way of front handle opening 253F, and a front plug opening 256F is defined at front edges of lower shell wall 255B, shell side walls 255S1 and 255S2, and upper wall 255T. A pair of guide grooves 258-1 and 258-2 are defined on the inside surfaces of side walls 255S1 and 255S2.

In accordance with an aspect of the present embodiment invention, as indicated in FIG. 6, plug support structure 260 includes relatively wide rear (first) end structures 261-1 and 261-2, and a relatively narrow front (second) end portion 265. A front support wall 262F is located at front end 265, and support side walls 262S1 and 262S2 extend between front support wall 262F and rear end structures 261-1 and 261-2. A pair of rails 268-1 and 268-2 are respectively formed on outside surfaces of support side walls 262S1 and 262S2. Plug support structure 260 includes an optional lower support wall 262B, and one or more support ribs 269 that are disposed on an upper surface of lower support wall 262B.

Cover plate 270 is a plastic wall that includes snap-couple engaging structures 271 formed along its peripheral edge. Engaging structures 271 are shaped and positioned to mate with corresponding grooves 251 formed along a peripheral upper edge of handle portion 252. In one embodiment cover plate 270 is formed from a transparent plastic, and/or includes a window 277 formed of transparent plastic.

Figures 7, 8, 9, 10:
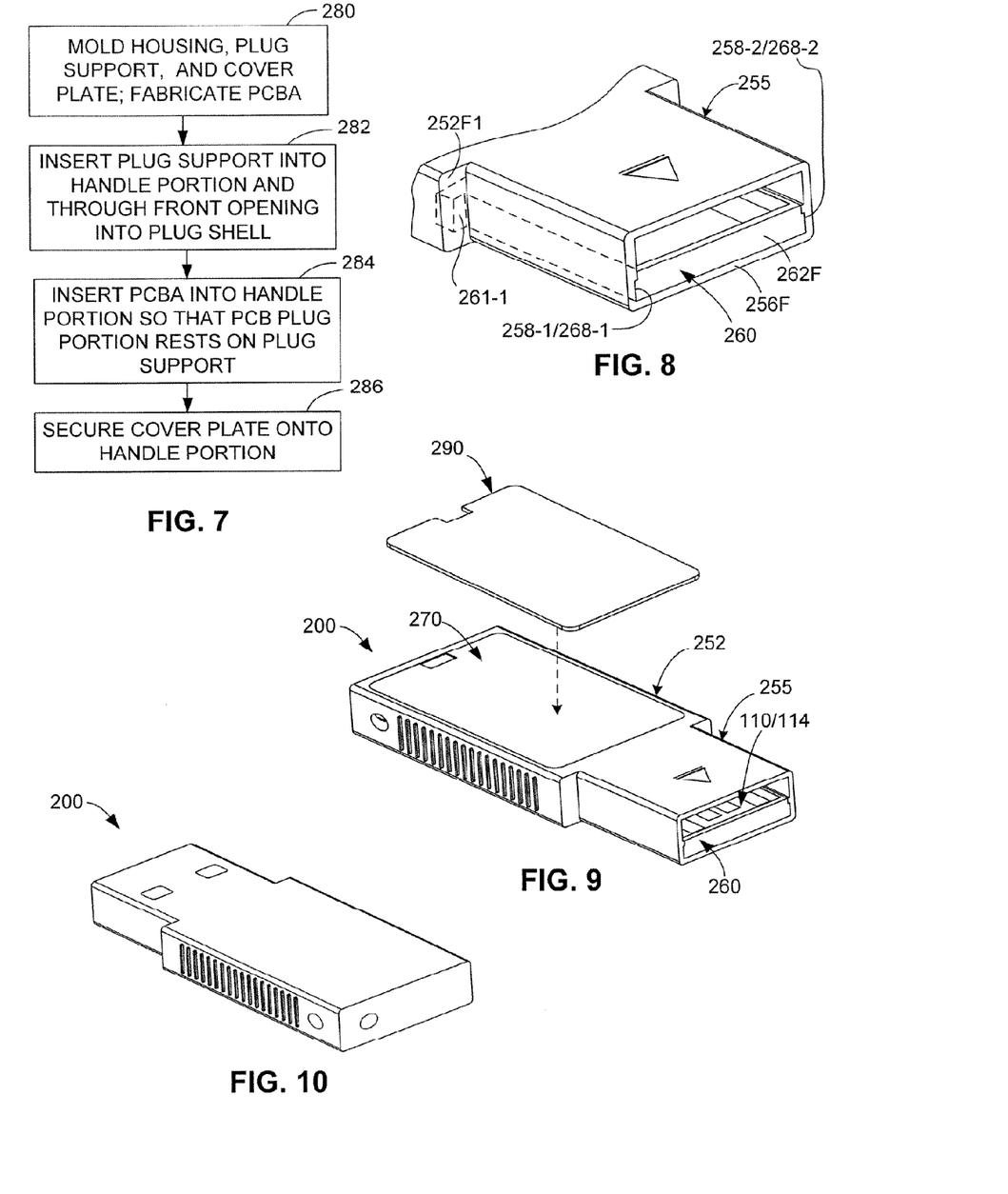
FIG. 7 is a flow diagram showing a method for manufacturing the USB device of FIG. 6.
FIG. 8 is a top-front perspective view showing a portion of the USB device of FIG. 6 in a partially-assembled state.
FIG. 9 is a top-front perspective view showing the USB device of FIG. 6 in an assembled state.
FIG. 10 is a bottom-rear perspective view showing the USB device of FIG. 9.

FIG. 7 is a flow diagram showing a method for manufacturing USB device 200 according to another embodiment of the present invention. First, plastic housing 250, plug support structure 260, and cover plate 270 are fabricated using known plastic injection molding techniques (block 280). Next, as indicated in block 282, plug support structure 260 is inserted into hollow region 254 through upper opening 253T and pushed into hollow interior region 257 of plug shell portion 255 through front opening 256F, with rails 268-1 and 268-2 respectively aligned with and engaged in guide grooves 258-1 and 258-2, until rear end structures 261-1 and 261-2 are snap-coupled into appropriate receptacles located behind front handle walls portions 252F1 and 252F2 (as indicated in FIG. 8). In the fully inserted position, front support wall 262F of plug support structure 260 is aligned with front opening 256F of plug shell portion 255, as indicated in FIG. 8. Next, in block 284, PCBA 110 is inserted into hollow region 254 through upper opening 253T such that PCB plug section 114 is mounted onto support ribs 269 (shown in FIG. 6), and then in block 286, cover plate 270 is snap-coupled or otherwise mounted onto handle portion 252 (as indicated in FIG. 9). In one embodiment, an optional adhesive label 290 with trademark or logo is attached to top of cover plate 270 as indicated in FIG. 9 to complete the production of USB device 200. Note that window 277 remains exposed by label 290, thereby allowing light from a light pipe 117 (see FIG. 6) to be visible through window 277. USB device 200 is shown in an upside-down, backside view in FIG. 10.

Figure 11:
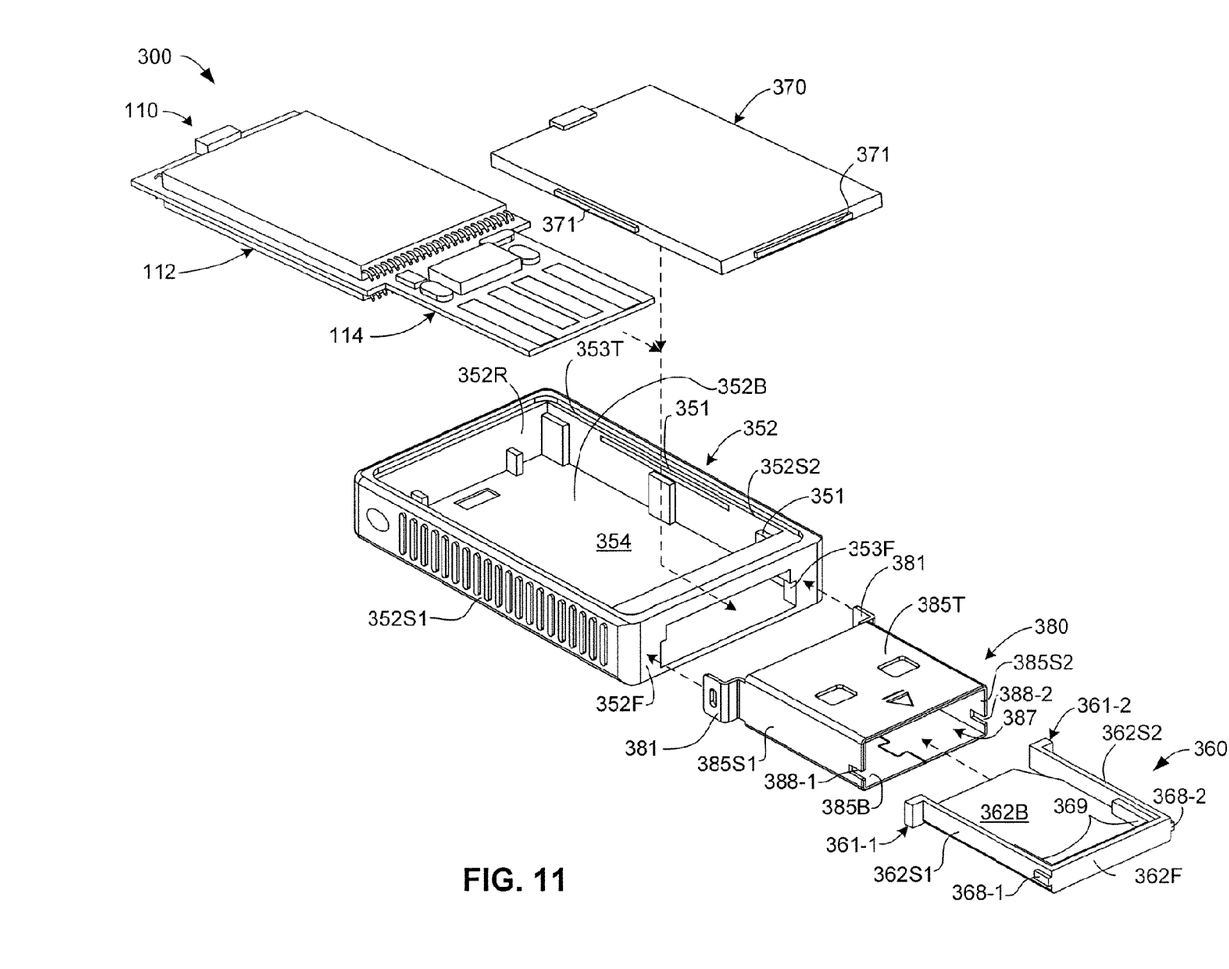
FIG. 11 is an exploded perspective view showing a USB device according to another embodiment of the present invention.

FIG. 11 is an exploded perspective view showing an USB device 300 according to another specific embodiment of the present invention. USB device 300 includes a plastic handle portion (housing) 352, a plug support structure 360, a cover plate 370, a metal plug shell structure 380, and PCBA 110 (discussed above).

Plastic handle portion 352 is injection molded in the manner described above, and includes a rear wall 352R, and a front wall 352F defining a front opening 353F, parallel side walls 352S1 and 352S2 extending between the rear and front walls, and a lower cover wall 352B. Handle portion 352 defines a hollow region 354 that is accessible through an upper opening 353T that is defined by adjacent upper edges of side walls 352S1 and 352S2, rear wall 352R and front wall 352F.

In accordance with the present embodiment, plug shell structure 380 is metal and is molded onto or otherwise fixedly connected to front wall 352F of plastic handle portion 352 by way of mounting structures 381 that respectively extend from the first and second shell side walls 385S1 and 385S2. Metal plug shell structure 380 also includes a lower shell wall 385B and an upper shell wall 385T that cooperate with first and second shell side walls 385S1 and 385S2 to surround a hollow interior region 387. A pair of engagement notches 388-1 and 388-2 are defines at the front edges of shell side walls 385S1 and 385S2.

Similar to the embodiment shown in FIG. 6, plug support structure 360 includes relatively wide rear (first) end structures 361-1 and 361-2, and a relatively narrow front (second) end portion 365. A front support wall 362F is located at front end 365, and support side walls 362S1 and 362S2 extend between front support wall 362F and rear end structures 361-1 and 361-2. A pair of locking protrusions 368-1 and 368-2 are respectively formed on outside surfaces of support side walls 362S1 and 362S2 adjacent to front wall 362F. Plug support structure 360 includes an optional lower support wall 362B, and one or more support ribs 369 that are disposed on an upper surface of lower support wall 362B.

Cover plate 370 is a plastic wall that includes snap-couple engaging structures 371 formed along its peripheral edge. Engaging structures 371 are shaped and positioned to mate with corresponding grooves 351 formed along a peripheral upper edge of handle portion 352. In one embodiment cover plate 370 is formed from a transparent plastic.

Figure 12:
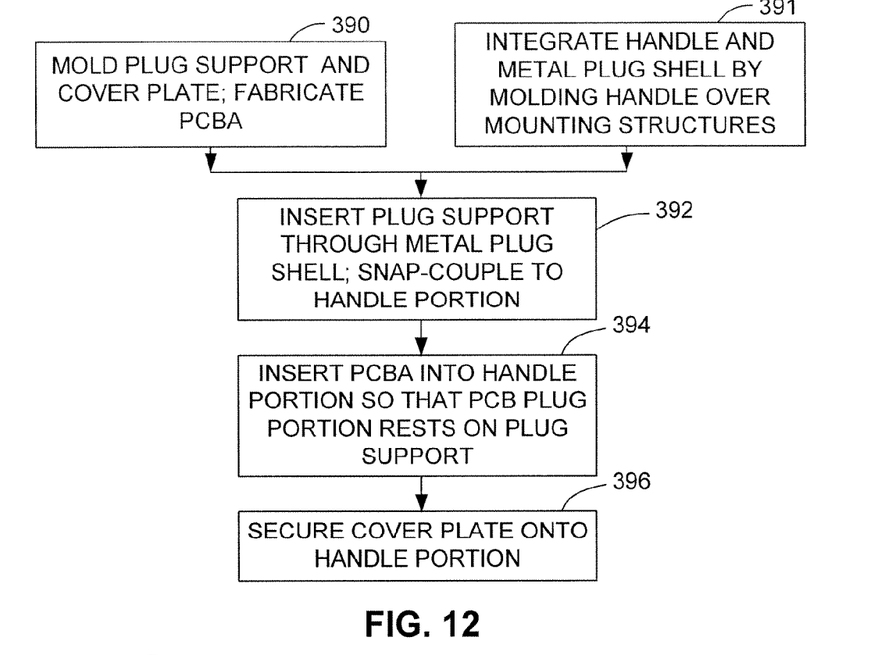
FIG. 12 is a flow diagram showing a method for manufacturing the USB device of FIG. 11.
Figure 13:
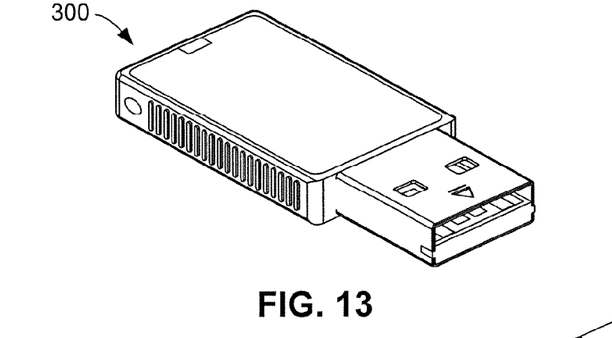
FIG. 13 is a top-front perspective view showing the USB device shown in FIG. 11 in an assembled state.
Figure 14:
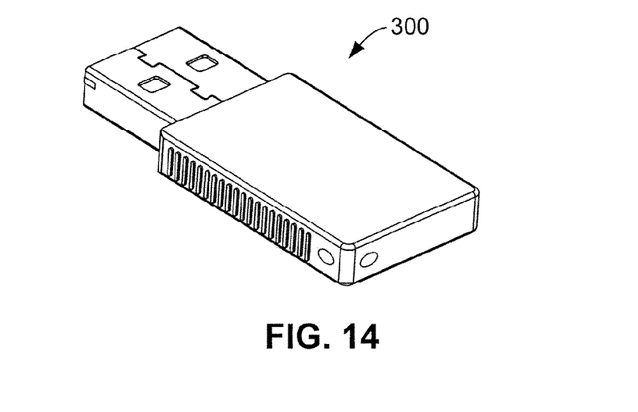
FIG. 14 is a bottom-rear perspective view showing the completed USB device of FIG. 13.

FIG. 12 is a flow diagram showing a method for manufacturing USB device 300 according to another embodiment of the present invention. Similar to the process form manufacturing USB device 200, the method includes fabricating plug support structure 360 and cover plate 370 using known plastic injection molding techniques (block 390). In addition, handle portion 352 is molded such that mounting structures 381 are molded inside of side handle walls 352S1 and 352S2 (block 391). In particular, a molding die is used that receives metal plug shell 380 such that mounting structures 381 are disposed inside cavities used to form front handle wall 352F and side handle walls 352S1 and 352S2. The subsequently injected molten plastic flows over both sides of mounting structures 381, thereby encasing mounting structures 381 in plastic, and fixedly securing metal plug shell 380 to the thus-formed plastic handle portion 352. Next, as indicated in block 392, plug support structure 360 is inserted into metal plug shell 380 with rear end structures 361-1 and 361-2 of plug support structure 360 bent inward until rear end structures 361-1 and 361-2 are snap-coupled into appropriate receptacles located behind front handle wall 352F. In the fully inserted position, locking protrusions 368-1 and 368-2 are snap-coupled or otherwise received in engagement notches 388-1 and 388-2 of first and second shell side walls 385S1 and 385S2, respectively. Next, in block 394, PCBA 110 is inserted into hollow opening 354 through upper opening 353T such that and PCB plug section 114 is mounted onto support ribs 369, and then in block 396, cover plate 370 is snap-coupled or otherwise mounted onto handle portion 352 (as indicated in FIG. 13). In one embodiment, an optional adhesive label with trademark or logo is attached to top of cover plate 370. USB device 300 is shown in an upside-down, backside view in FIG. 14.

The various USB device structures described herein may be modified using appropriate ICs (e.g., ICs 130 and 135) to serve as convenient external storage for, for example, MP3 players (i.e., media storage for music), digital cameras, and mobile phones.

Figure 15:
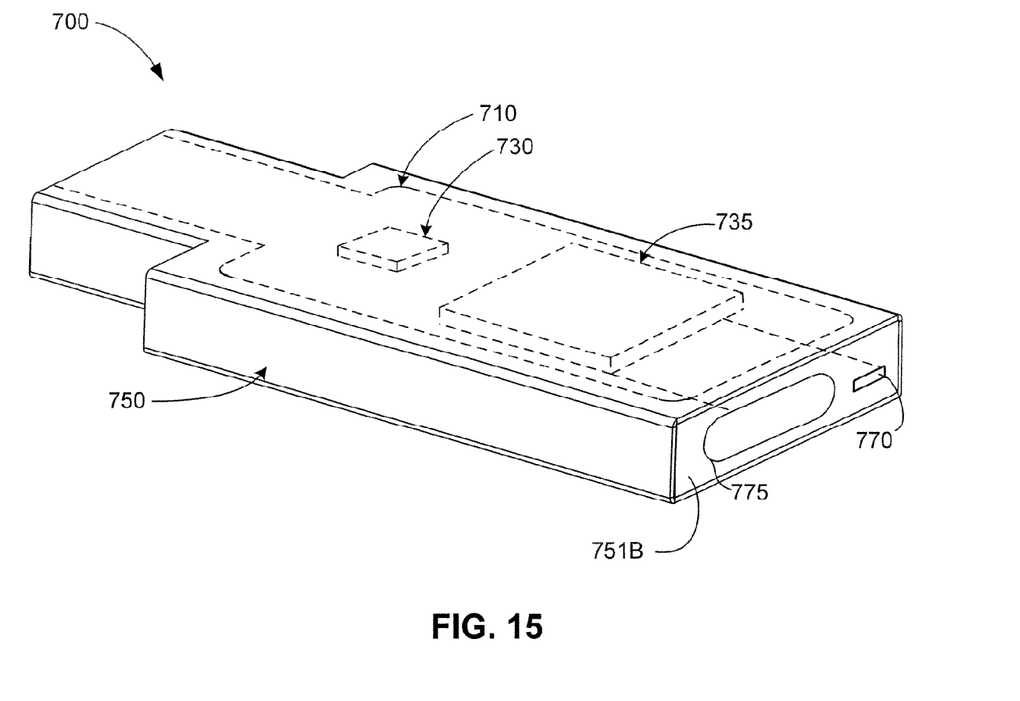
FIG. 15 is a perspective view showing a wireless communication-type USB device produced in accordance with another embodiment of the present invention.

In yet another embodiment, the disclosed USB device structures may be utilized to facilitate wireless communications. In this case, a USB device (e.g., Bluetooth USB adapter 700 shown in FIG. 15) may be plugged into the USB port of a host device, and may include a wireless communication device 735 that generates wireless signals emitted from a transceiver antenna 775, which may be provided on a back side of housing 750 to maximize the effect of signal transmission. Wireless communication device 735 communicates with a host (e.g., a computer) via USB control IC 730, and includes a Bluetooth controller, a radio frequency (RF) transceiver, a baseband controller, memory (e.g., EEPROM), a voltage regulator, a crystal, and a control circuit for controlling LED 770. These circuits may be combined together, along with passive circuits (e.g., resistors, capacitors and inductors) in a single chip, as depicted, or formed on one or more separate chips that are mounted on PCB 710 and enclosed by housing 750 and associated case 760 that are connected together in the manner described above. Such an arrangement would facilitate communication between the host and a wireless communication device, such as a Blue-Tooth-enabled device. Bluetooth is a wireless technology that enables any electrical device to wirelessly communicate in the 2.4 GHz frequency band. It allows devices such as mobile phones, headsets, PDA's and computers to communicate and send data to each other without the need for wires or cables to link to devices together. It has been specifically designed as a low cost, low power, radio technology, which is particularly suited to the short range Personal Area Network (PAN) application. By plugging Bluetooth USB adapter 700 into the USB port, the Bluetooth USB adapter enables a non Bluetooth electrical device (i.e., the host) to communicate with Bluetooth enabled devices. One specific wireless application may be a BlueTooth mouse device, which are used today for cursor pointing. Another application example is allowing computer user doing two-way communication to Bluetooth-wireless equipped mobile phones, PDA, keyboard, printer, digital camera, and MP3 player. Other applications may include wireless headsets. Yet another application may include enabling BlueTooth wireless connections inside an automobile to facilitate "hands free" operation of a mobile phone. Of course, other wireless communication protocols, such as IrDA infrared transmitting devices, may also be utilized in conjunction with USB devices of the present invention.

In addition to the specific housing arrangements described above with reference to the various disclosed embodiments, those skilled the art will recognize that other housing structures and connection methods may be used. For example, instead of a tab/slot snap-together arrangement, the upper and lower housing portions may be connected by way of ultrasonic welding. Accordingly, unless otherwise specified, the appended claims are not intended to be limited to the disclosed housing arrangements.

Although the present invention has been described with respect to certain specific embodiments, it will be clear to those skilled in the art that the inventive features of the present invention are applicable to other embodiments as well, all of which are intended to fall within the scope of the present invention.

The invention claimed is:

1. A Universal-Serial-Bus (USB) device comprising:
    a printed circuit board assembly (PCBA) including:
        a printed circuit board (PCB) having opposing upper and lower surfaces and including a PCB body section and a PCB plug section,
        a plurality of metal contacts disposed on the upper surface of the PCB plug section, and
        at least one integrated circuit (IC) mounted on the PCB body section, the IC including means for processing USB signals transmitted to the plurality of metal contacts; and
    a plastic handle portion including a front wall defining a front handle opening, a rear wall, and first and second side handle walls respectively extending between the front and rear walls and defining a hollow handle region;
    a plug shell structure attached to and extending from the front wall of the plastic handle portion, the plug shell structure including a lower shell wall, first and second shell side walls extending upward from the lower shell wall, and an upper shell wall integrally connected to upper ends of the first and second shell side walls, wherein the plug shell defines a hollow interior region that communicates with the hollow handle region via the front handle opening, and wherein front edges of the lower shell wall, the first and second shell side walls, and the upper shell wall define a front opening; and
    a plug support structure having a first end portion that is coupled to the plastic handle portion, and a second end portion that extends through the front handle opening and is received in the plug shell structure,
    wherein the PCBA is mounted into the handle portion such that the PCB body section is disposed between the front and rear walls, and the PCB plug portion extends through the front handle opening and is supported on the plug support structure such that the upper shell wall is positioned over and spaced from the upper surface of the PCB plug section by a predetermined gap.

2. The USB device according to claim 1, wherein the plastic handle portion and the plug shell structure comprise an integrally molded plastic housing.

3. The USB device according to claim 2,
    wherein the plug shell structure defines a pair of guide grooves respectively defined by the shell side walls, and
    wherein opposing side walls extending along the second end portion of the plug support structure define rails that are slidably received in the pair of guide grooves.

4. The USB device according to claim 1,
    wherein the plug support structure comprises:
        a lower support wall; and
        a plurality of support ribs disposed on an upper surface of the lower support wall, and
    wherein the PCBA is mounted on the plug support structure such that the PCB plug section abuts an upper surface of the support ribs.

5. The USB device according to claim 1,
   wherein the plastic handle portion further includes a lower cover wall integrally molded to lower edges of the front wall, the rear wall, and first and second handle side walls, and
   wherein the USB device further comprises a cover plate that is snap-coupled onto the plastic handle portion adjacent to upper edges of the front wall, the rear wall, and side handle walls, whereby the PCB body section is enclosed within the plastic handle portion.

6. The USB device according to claim 1, wherein the plug shell structure is metal and is molded onto the front wall of the plastic handle portion.

7. The USB device according to claim 6, wherein the metal plug shell structure includes a pair of mounting structures that respectively extend from the first and second shell side walls and are disposed inside the first and second handle side walls.

8. The USB device according to claim 6,
   wherein the first and second shell side walls define engagement notches, and
   wherein opposing side walls extending along the second end portion of the plug support structure include locking protrusions that are received in the engagement notches of the first and second shell side walls.

9. The USB device of claim 1, wherein the PCBA comprises a lead-free structure.

10. The USB device of claim 1, further comprising a light-producing device mounted on the PCB body section, wherein a peripheral wall of the handle portion defines a window aligned such that the light producing device is visible through the opening.

11. The USB device of claim 1, wherein at least one wall of the handle portion of the housing defines a key-chain hole for receiving a key chain therein.

12. The USB device of claim 1, wherein the PCB further comprises metal dividers formed on the upper surface of the PCB, each of the metal dividers being located between an adjacent pair of the metal contacts.

13. The low-profile USB device of claim 1, wherein the ICs include a wireless communication transmission device.

* * * * *